(12) United States Patent
Apro et al.

(10) Patent No.: US 11,329,681 B1
(45) Date of Patent: May 10, 2022

(54) COMMUNICATION DEVICES AND SYSTEMS

(71) Applicant: Siemens Canada Limited, Oakville (CA)

(72) Inventors: Attila Apro, Barrie (CA); Maximilian Seiffert, Toronto (CA); Dhruva Maharaj, Toronto (CA)

(73) Assignee: Siemens Canada Limited, Ontario (CA)

( * ) Notice: Subject to any disclaimer, the term of this patent is extended or adjusted under 35 U.S.C. 154(b) by 0 days.

(21) Appl. No.: 17/600,142

(22) PCT Filed: May 1, 2019

(86) PCT No.: PCT/US2019/030156
§ 371 (c)(1),
(2) Date: Sep. 30, 2021

(87) PCT Pub. No.: WO2020/222838
PCT Pub. Date: Nov. 5, 2020

(51) Int. Cl.
*H04B 1/16* (2006.01)
*H04B 1/20* (2006.01)

(52) U.S. Cl.
CPC ......... *H04B 1/1615* (2013.01); *H04B 1/1661* (2013.01); *H04B 1/205* (2013.01)

(58) Field of Classification Search
CPC ..... H04B 1/1615; H04B 1/1661; H04B 1/205
See application file for complete search history.

(56) References Cited

U.S. PATENT DOCUMENTS

| | | |
|---|---|---|
| 2006/0026650 A1 | 2/2006 | Kim et al. |
| 2014/0121787 A1* | 5/2014 | Yamazaki ............. G05B 15/02 700/19 |
| 2017/0039155 A1* | 2/2017 | Feng .................. G06F 13/4282 |
| 2017/0170562 A1 | 6/2017 | Lee et al. |
| 2020/0280986 A1* | 9/2020 | Peterson ................. H04B 1/40 |

FOREIGN PATENT DOCUMENTS

EP  1187353 A2  3/2002

OTHER PUBLICATIONS

International Search Report corresponding to Application No. PCT/US2019/030156; Filing Date: May 1, 2019; 17 pages.

* cited by examiner

*Primary Examiner* — Nguyen T Vo

(57) ABSTRACT

An adaptive radio frequency module including a switching circuit to switch receipt of a voltage, an assembly including the adaptive RF module, a system comprising a base unit with one or more radio frequency modules, and a method of operation of the system are provide.

20 Claims, 3 Drawing Sheets

COMMUNICATION DEVICES AND SYSTEMS

This application is a national phase filing under 35 U.S.C. § 371 of International Patent Application No. PCT/US2019/030156, filed May 1, 2019, which is incorporated herein by reference in its entirety.

TECHNICAL FIELD

The present disclosure is directed, in general, to adaptive and modular devices and systems, and more specifically to adaptive and modular communications devices and systems.

BACKGROUND

A Radio Frequency (RF) module includes an antenna that converts between electrical power and radio waves. The antenna may be connected to a transmitter, receiver or transmitter in order to transmit and/or to receive radio waves over the antenna. RF modules facilitate communication between wireless devices. Global System for Mobile communication (GSM) based on the European Telecommunications Standards Institute (ETSI) standards, Wi-Fi based on the Institute of Electrical and Electronics Engineers (IEEE) 802.11x standards, worldwide interoperability for microwave access (WiMAX) base on IEEE 802.16 standards and ZigBee based on IEEE 802.15x standards are a few of the wireless technologies available for wireless devices.

RF modules require certification to make sure regulatory requirements are met. The certifications may be based on uses of the RF module and/or region(s) the RF module is to be sold. For example, the Federal Communication Commission (FCC) certifies RF modules for the United States, and the European Telecommunications Standards Institute (ETSI) certifies a telecommunications RF module to be sold in the European Union.

SUMMARY

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

An adaptive radio frequency (RF) module comprises an RF unit, a first bus connector is configured to receive a first voltage, a second bus connector is configured to receive a second voltage, and a switching circuit is configured to supply an operational voltage to the RF unit. The switching circuit is configured to switch between the first bus connector and the second bus connector to receive the first voltage or the second voltage. The first bus connector may be different than the second bus connector. For example, the first bus connector may be a universal serial bus and the second bus connector may be Ethernet. A first protocol used by the first bus connector may be different than a second protocol used by the second bus connector. The first voltage may substantially be an operational voltage of the RF unit. The second voltage may be different than the operational voltage of the RF unit. For example, the second voltage may be greater than the operational voltage of the RF unit.

The switching circuit may comprise a voltage controller configured to change the second voltage to the operational voltage of the RF unit. The operational voltage of the RF unit may between 3V to 12V. The operational voltage of the RF unit may be substantially between 3V to 5V. The switching circuit may be configured to switch the between the first bus connector and the second bus connector according to a voltage detected at one of the bus connectors.

A modular RF assembly comprises the adaptive RF module and a housing, where the housing may be configured to attach to a base unit or configured to be separate from the base unit, at least one of the first bus connector and the second bus connector is accessible from the housing. The housing may prevent access to the first bus connector or to the second bus connector.

The modular RF assembly may be an internal RF module assembly, where the housing is configured to attach to a base unit, the adaptive RF module is arranged within the housing, the first bus connector is an internal interface, and the housing is configured so the first bus connector is assessable and the second bus connector inaccessible.

The modular RF assembly may be an external RF module assembly, where the adaptive RF module is arranged within the housing, the first bus connector is an internal interface, the second bus connector is configured to connect over a wire to the housing to the base unit arrange remotely from the external modular RF assembly, the second bus connector is assessable from the housing and the first bus connector is inaccessible.

An RF system comprises a base unit and an RF assembly, where the RF assembly is communicatively connected to the base unit by a internal or external bus connector.

The RF system may include a modular RF assembly, where the modular RF assembly may be an internal modular RF assembly that is mounted to the base unit and physically coupled to the base unit by the first bus connector, the first bus connector is an internal interface, and the switching circuit supplies the operational voltage to the RF unit using the first voltage from the first bus connector.

The RF system may include a modular RF assembly, where the modular RF assembly may be an external modular RF assembly that is physically separated from the base unit and coupled to the base unit over a wire by the second bus connector, and the switching circuit supplies the operational voltage to the RF unit using the second voltage from the second bus connector, A method is provided comprising receiving over an internal bus connector or an external bus connector a first packet from an RF assembly associated with a mobile device, by a base unit, identifying a transport medium and/or a protocol of the first packet, an sending a second packet from the base unit to a network based on the identifying of the transport medium and/or the protocol of the first packet.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 6 illustrates a front view of a modular RF assembly connected to a base unit.

DETAILED DESCRIPTION

Figure 1:
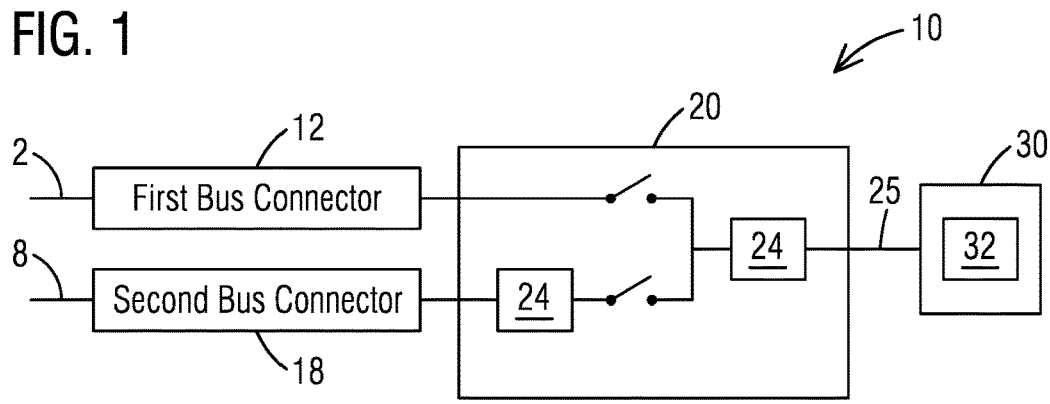
FIG. 1 illustrates a diagrammatic representation of an adaptive RF module.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly unless expressly limited in some examples. For example, the terms "include" and "comprise," as well as derivatives thereof, mean inclusion without limitation. The singular forms "a", "an" and "the" are intended to include the plural forms as well unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion unless the context clearly indicates otherwise. Further, the phrase "based on" is intended to mean "based, at least in part, on" unless explicitly stated otherwise. Terms "about" or substantially" or like terms are intended to cover variations in a value that are within normal industry manufacturing tolerances for that dimension. If no industry standards are available, a variation of 20 percent would fall within the meaning of these terms unless otherwise stated. Ranges are understood to be inclusive of the starting and ending values unless otherwise stated.

FIG. 1 illustrates a diagrammatic representation of an adaptive RF module 10. The adaptive RF module 10 includes a plurality of bus connectors 12, 18 a switching circuit 20, and an RF unit 30. The plurality of bus connectors 12, 18 is configured to receive a voltage 2, 8 to power the adaptive RF module 10. The first bus connector 12 and second bus connector 18 may be configured to receive different voltages, where the first voltage 2 is different than the second voltage 8. The switching circuit 20 switches between the plurality of bus connectors 12, 18 to receive the voltage from one of the pluralities of bus connectors 12, 18 and supplies the RF unit 30 with an operational voltage 25. The adaptive RF module 10, adapts to receiving the voltage from one of the pluralities of bus connectors 12, 18 via the switching circuit 20. The operational voltage 25 is the voltage the RF unit 30 operates. The received voltage 2, 8 may be different than an operational voltage 25. To compensate for when the received voltage 2, 8 is different than an operational voltage 25, the switching circuit 20 may include a voltage controller 24 to controls the voltage to be at the operational voltage 25. A voltage controller 24 comprises any device to adjust or regulate voltage.

The RF unit 30 includes an antenna 32. The RF unit 30 may include any one or combination of memory, transmitter, receiver, transceiver, and microcontroller being coupled to the antenna 32.

Figure 2:
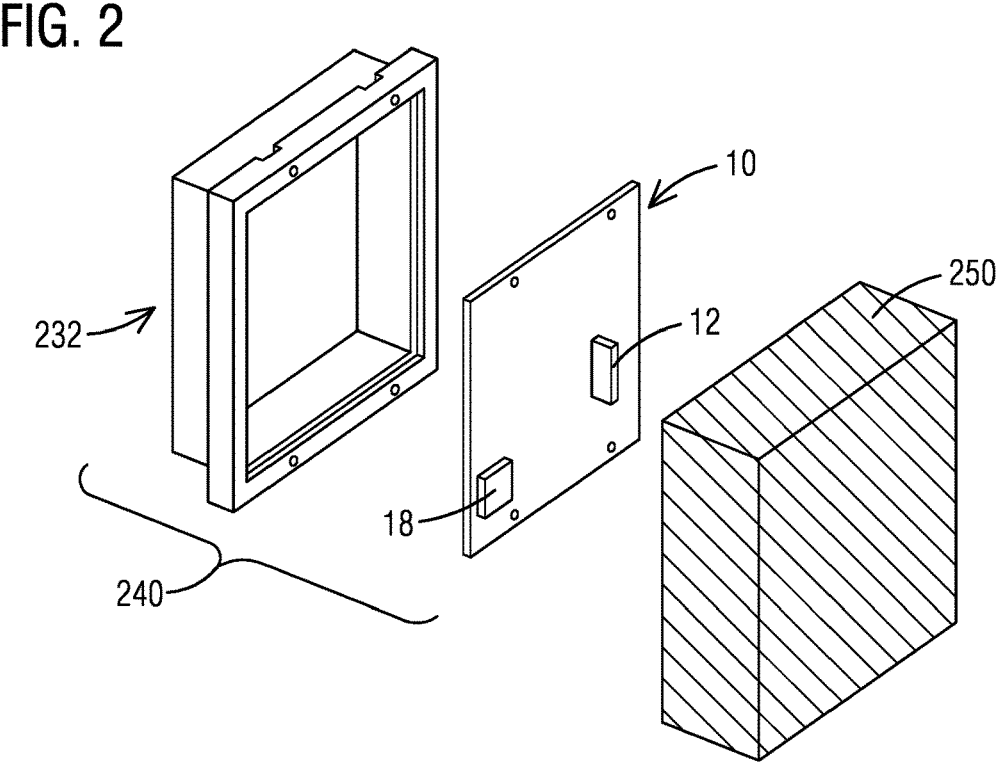
FIG. 2 illustrates a modular RF assembly as an internal modular RF assembly in an exploded view.
Figure 4:
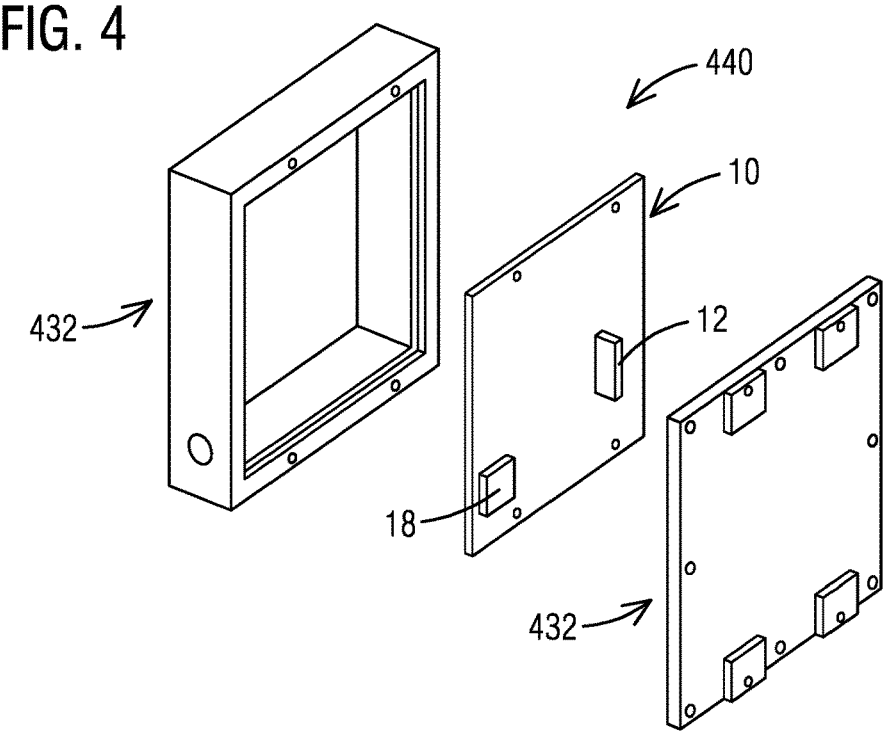
FIG. 4 illustrates a modular RF assembly as an external modular RF assembly in an exploded view.

FIGS. 2 and 4 illustrate exploded views of modular RF assemblies 240, 440. The RF system includes a housing 232, 432 and the adaptive RF module 10 is arranged in the housing 232, 432. At least one of the pluralities of bus connectors 12, 18 is accessible from the housing 232, 432. Each of the plurality of bus connectors 12, 18 may be a different type of connector within the modular RF assembly 240, 440.

Figure 3:
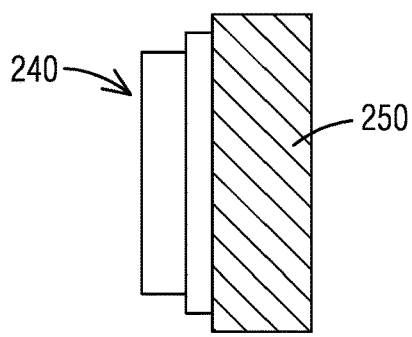
FIG. 3 illustrates an internal modular RF assembly connected to a base unit.

According to FIG. 2, the modular RF assembly 240 is an internal modular RF assembly where the first bus connector 12 is an internal interface that is accessible from the housing 232. The first bus connector 12 is configured to receive the first voltage 2. The first bus connector 12 is configured to connect to a base unit 250. The housing 232 is configured to attach to the base unit 250. The second bus connector 18 may be inaccessible in the internal modular RF assembly. The inaccessibility may be achieved by covering the second bus connector 18 by the housing 232. FIG. 3 illustrates a front view of the internal modular RF assembly 240 mounted to the base unit 250.

Figure 5:
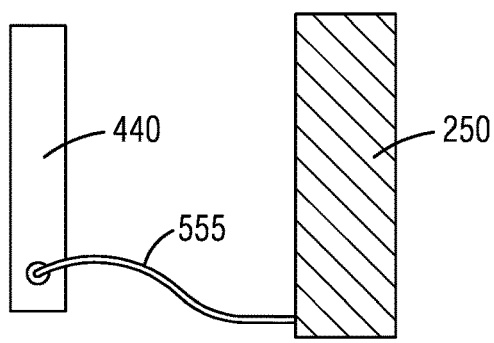
FIG. 5 illustrates an external modular RF assembly connected to a base unit.

According to FIG. 4, the modular RF assembly is an external modular RF assembly 440. The housing 432 provides access to the second bus connector 18 of the external modular RF assembly 440. The second bus connector 18 is configured to receive the second voltage 8. The access is on an exterior of the housing 432. The first bus connector 12 may be inaccessible in the external modular RF assembly 440. The inaccessibility may be achieved by covering the first bus connector 12 by the housing 432. FIG. 5 illustrates a front view of the external modular RF assembly 440 connected to the base unit 250 by a wire 555.

Figure 6:
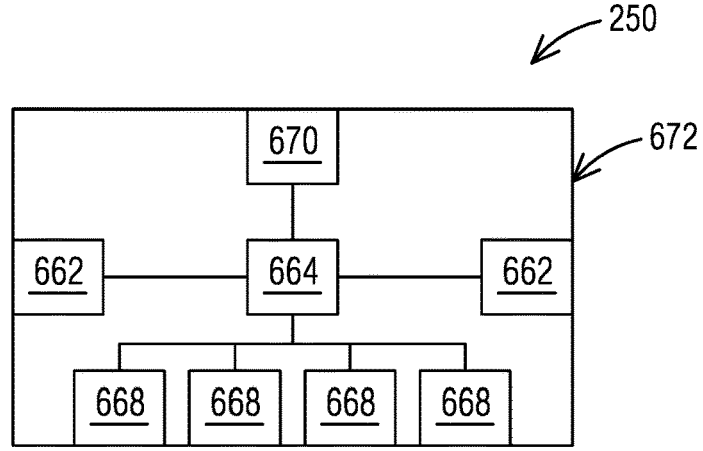
FIG. 6 shows a schematic of a base unit.

Referring to FIG. 6, a schematic view of a base unit 250 is provided. The base unit 250 includes at least one bus connector 662, 668, a network connector 670, a processor 664, and a casing 672. An internal bus connector 662 is configured to connect to a mating bus connector, for example, the first bus connector 12 of an internal modular RF assembly 240. An external bus connector 668 is configured to connect to a mating bus connector, for example, the second bus connector 18 of an external modular RF assembly 440. The network connector 670 is configured to connect to a network. Processor 664 is coupled to the internal bus connector 662, to the external bus connector 668, and to the network connector 670. The processor 664 may be any device that can execute software instructions, for example, a microcontroller (MCU) or a microprocessor (MP). The casing 672 encloses the processor 664 and provides access to internal bus connector 662 and to the external bus connector 668.

Any number of internal bus connectors 662 and/or external bus connectors 668 may be provided in the base unit 250. The illustrated base unit 250 includes two internal bus connectors 662 and six external bus connector 668. One skilled in the art would recognize that two internal bus connectors 662 and six external bus connectors 668 is merely one embodiment of a base unit 250. The base unit 250 may include, for example, at least one internal bus connector 662 and at least one external bus connectors 668.

A modular RF assembly 240, 440 may be realized by the adaptive RF module 10 that includes the plurality bus connectors 12, 18 and the switching circuit 20. By changing the housing, the modular RF assembly 240, 440 may be configured as an internal modular RF assembly or an external modular assembly. A reduction of certifications may be realized via the modularization. For example, one certification of adaptive RF module 10 by instead of two, one for an external modular RF assembly and one for an internal assembly.

Figure 7:
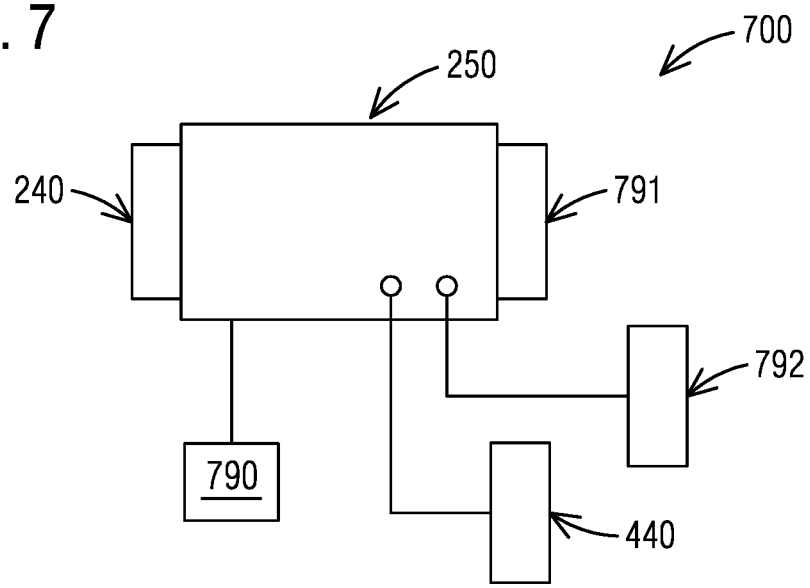
FIG. 7 illustrate a diagram of an RF system

Referring to FIG. 7, an RF system 700 is provided. The RF system 700 includes the base unit 250 connected to a network 790 and at least one RF device. The RF system 700 may be configured using any number of internal RF assemblies 240, 791 and/or any number of external RF assemblies 440, 792. Factors that may influence the location of the RF assembly may be, for example, signal strength and/or physical constraints of the facility where the RF system 700 is housed.

By way of example only, FIG. 7 illustrates the base unit 250 connected to the internal modular RF assembly 240, the external modular assembly 440, an internal RF assembly 791 and an external RF assembly 792. It would be understood this example is merely to illustrate how the system may comprises the modular RF assemblies 240, 440 and to illustrated how the system may comprise the RF assemblies 790, 791.

As described above, the internal modular RF assembly 240 and the external modular assembly 440 include the adaptive RF module 10 that comprises a switching circuit 20 to switch between the plurality of bus connectors 12, 18. The adaptive RF module 10, adapts the module to use one of the plurality of bus connectors 12, 18. For example, each of the plurality of bus connectors 12, 18 are functional where one of the plurality of bus connectors 12, 18 is used to supply the voltage during operation.

Neither the internal RF assembly 791 nor external RF assembly are adaptive to use one of a plurality of bus connectors. Internal RF assembly 791 includes an RF module including a single functional connector to interface with the internal bus connector 662. Similarly, external RF assembly 792 includes an RF module including a single functional connector to interface with the external bus connector 668. There is no need for a switching circuit 20 for the internal RF assembly 791 or for the external RF assembly 792 as they each include a single functional connector.

Mobile devices use wireless protocols to communicate wirelessly to an RF system. Any wireless protocol may be used to communicate by the mobile device. For example, Wi-Fi, wireless local area network (WLAN), global system for mobile communications (GSM), long-term evolution (LTE), code-division multiple access (CDMA), time-division multiple access (TDMA), evolution-data optimized (EVDO), high speed packet access (HSPA), universal mobile telecommunications system (UMTS), WiMax, and the like It would be understood that the list of wireless protocols is not exhaustive and that any other wireless protocol may be used. It would also be understood that different generations and/or versions of a protocol may be used. For example, anyone of the various generations and/or versions of LTE such as private LTE, LTE Advanced and LTE-lite. The mobile device communicates with the RF system 700 by way of the RF assembly 240, 440, 791, 792. The communication protocol between the mobile device and the RF assembly may be different for each technology. Within the same technology, the communication protocol may be different according to a version of the protocol. For example, different versions of the protocol may be employed by different network carriers. Each of the RF assemblies 240, 440 791, 792 connected to a base unit 250 may communicate wirelessly via different protocols.

The base unit 250 is any device that connects to the network 790 whereby the mobile devices are connected to the network by way of the base unit 250. The base unit 250 is, for example, is a Wi-Fi access point or an edge router.

During operation, the base unit 250 provides power to the RF assembly 240, 440, 791, 792 via the bus connector 662, 668.

The modular RF assembly 240, 440 receives the power from the base unit 250 over the first bus connector 12 or to the second bus connector 18. The switching circuit 20 is switched to receive the first voltage 2 from the first bus connector 12 or the second voltage 8 from the second bus connector 18. When the received voltage 2, 8 is different than the operational voltage 25, the received voltage may be controlled by a voltage controller 24 to match the operational voltage 25. The switching circuit 20 of the modular RF assembly 240, 440 switches between the plurality of the bus connectors 12, 18 to provide power to the adaptive RF module 10. The switching may be handled automatically by the switching circuit 20. For example, the switching circuit 20 switches between the plurality of bus connectors 12, 18 according to a voltage detected at one of the plurality of bus connectors 12, 18. The switching circuit 20 may be manually set and be a physical switch, e.g. a toggle, that is pre-set between the plurality of bus connectors to use one of the pluralities of bus connectors. Data, which is accessible to the switching circuit 20, may be stored in memory indicating which of the bus connectors 12, 18 is to provide power to the adaptive RF module 10 and switching circuit 20.

When an internal modular RF assembly 240 is mounted to the base unit 250, the adaptive RF module 10 and the base unit 250 are communicatively coupled by the first bus connector 12 and the internal bus connector 662. The coupling of the first bus connector 12 and the internal bus connector 662 is maintained within the housing 232 of the internal modular RF assembly 240 and within a casing 672 of the base unit 250. The first bus connector 12 and the internal bus connector 662 may be, for example, a universal serial bus (USB) connector or Peripheral Component Interconnect (PCI) connector. The transport medium is the respective connectors 12, 662, for example, USB or PCI. The communication protocol between the adaptive RF module 10 of the internal modular RF assembly and the base unit 250 may be dependent on the type of connector. The connection between the first bus connector 12 of the internal modular assembly and the base unit 250 may be made when the modular RF assembly 240 is mounted to the base unit 250. For example, the first bus connector 12 and the internal bus connector 662 are mating connectors that engage when the modular RF assembly 240 is mounted to the base unit 250.

During operation of the internal modular RF assembly 240, the base unit 250 provides power to the first bus connector 12. The switching circuit 20 is switched to receive the first voltage 2 from the first bus connector 12. An operational voltage 25 is supplied to the RF unit 30. The first bus connector 12 may receive a voltage between 3V and 12V. The first bus connector 12 may receive a voltage substantially between 3V and 5V. Typically, the first voltage 2 received over the first bus connector 12 is the same as or essentially the same as the operational voltage 25 of the RF unit 30. When the received first voltage 2 is different than the operational voltage 25, the received voltage may be controlled by a voltage controller 24 to match the operational voltage 25.

When an external modular RF assembly 440 is connected externally from the base unit 250, the adaptive RF module 10 and the base unit 250 are communicatively coupled by the second bus connector 18. The second bus connector 18 is any connector that communicatively couples the adaptive RF module 10 to the base unit 250 by a wire 555 that is external from the housing 432 of the external modular RF assembly 440 and a casing 672 of the base unit 250. For example, the second bus connector 18 may be an Ethernet connector or an optical fiber connector. The wire 555, being the transport medium, may be an Ethernet cable or optical fiber cable. The communication protocol between the adaptive RF module 10 of the external modular RF assembly 440 and the base unit 250 may be dependent on the type of connector.

During operation of the external modular RF assembly 440, the base unit 250 provides power to the second bus connector 18. The switching circuit 20 is switched to receive the second voltage 8 from the second bus connector 18. The second bus connector may receive a voltage higher than an operational voltage 25. When the voltage is higher than an operational voltage 25, the switching circuit 20 controls the voltage to reduce the voltage to the operation voltage by the voltage controller 24. For example, when the second bus connector 18 is Ethernet a voltage from the base unit 250 is used to provide the supply power to the adaptive RF module over the Ethernet. Power over Ethernet (PoE) typically supplies a voltage between 44 and 57 volts. For PoE, the second bus connector 18 receives a voltage between 44 and 57 volts, which is greater than the operational voltage 25 of the RF unit 30.

Figure 8:
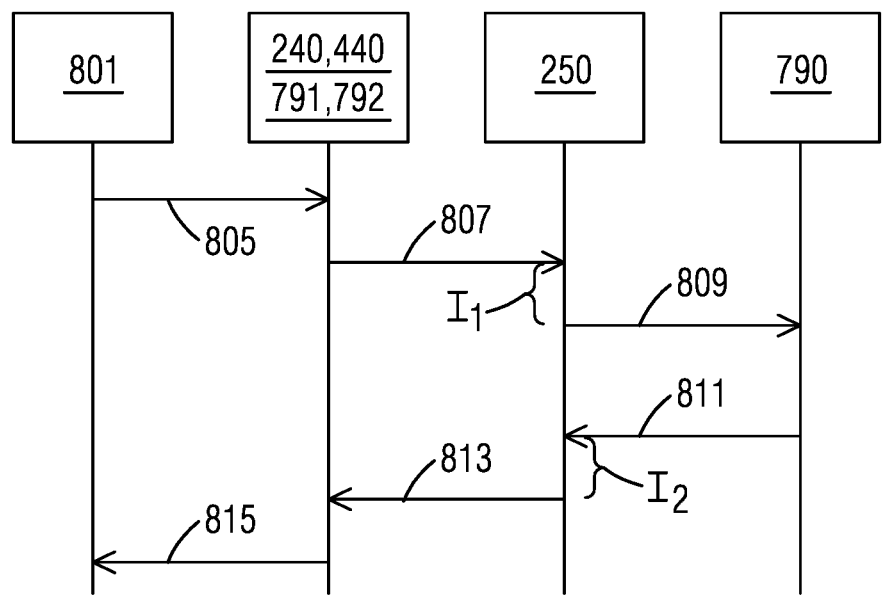
FIG. 8 illustrates a communications flow according to the RF system.

A conventional base unit only has a single type of bus connector, for example, an internal bus connector 662. A single type bus connector, internal or external, simplifies the communication between the RF assembly 240, 440, 791, 792 and the conventional base as the transport medium of the bus connector the same. With the transport medium being the same, there is a single protocol between the convention base unit and the RF device. With base unit 250 comprising multiple types of bus connectors, the internal bus connector 662 and external bus connector 668 there are different transport mediums. The processor 664 of the base unit 250 is configured to FIG. 8 illustrates a communications flow between a mobile device 801 and the network 790 over the system 700. A packet of information 805 formed according to a wireless protocol may be received by an RF assembly 240, 440, 791, 792 from a mobile device 801. For example, the packet of information 805 received by RF device 803 is formed according to a WIFI protocol. Based on the received packet of information, the RF assembly 240, 440, 791, 792 may send a packet 807 of information to the base unit 250. The packet 807 of information is transported over the bus connector 662, 668 by a protocol suitable for the respective bus connector 662, 668 that connects to the RF device 803. The base unit 250 receives the packet 807 of information according to a protocol suitable to the transport medium of the respective bus connector 662, 668. For example, the packet 807 of information is transported over an external bus connector 668, such as Ethernet using a Point-to-Point Protocol (PPP). Since the packet 807 of information may have been transported over either the internal bus connector 662 or the external bus connector 668, the base unit 250 may be configured to identify $I_1$ the transport medium on which the packet 807 of information was received and/or the protocol of packet 807 of information. After the base unit, 250 identifies $I_1$, the transport medium and/or protocol, the base unit 250 may send a packet 809 of information based on the received packet 807 of information and the identified data $I_1$.

A packet 811 of information with information for the mobile device 801 may be received by the base unit 250 from the network 790. Since the RF assembly 240, 440, 791, 792 in communication with the mobile device 801 may be connected to the base unit 250 by the internal bus connector 662 or the external bus connector 668, the base unit 250 may be configured to identify 12 the transport medium on which to send a packet 813 of information and/or the protocol the packet 813 of information to send to the RF assembly 240, 440, 791, 792. After the base unit 250, identifies $I_2$, the transport medium and/or protocol, the base unit 250 may send the packet 813 of information based on a received packet 811 of information and the identified data 12. Based on the packet 813 of information, the RF device 803 may send a packet 815 of information to the mobile device 801.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. An adaptive radio frequency (RF) module comprising:
   an RF unit;
   a first bus connector configured to receive a first voltage;
   a second bus connector configured to receive a second voltage; and a switching circuit configured to supply an operational voltage to the RF unit;
wherein the switching circuit switches between the first bus connector and the second bus connector to receive the first voltage or the second voltage.

2. The adaptive RF module according to claim 1, wherein the first bus connector is different than the second bus connector.

3. The adaptive RF module according to claim 1, wherein a first protocol used by the first bus connector is different than a second protocol used by the second bus connector.

4. The adaptive RF module according to claim 1, wherein the first bus connector is a universal serial bus, and
wherein the second bus connector is Ethernet.

5. The adaptive RF module according to claim 1, wherein the first voltage is substantially an operational voltage of the RF unit, and
wherein the second voltage is greater than the operational voltage of the RF unit.

6. The adaptive RF module according to claim 1, wherein the switching circuit comprises a voltage controller configured to change the second voltage to the operational voltage of the RF unit.

7. The adaptive RF module according to claim 1, wherein the operational voltage of the RF unit is between 3V to 12V.

8. The adaptive RF module according to claim 1, wherein the operational voltage of the RF unit is substantially between 3V to 5V.

9. The adaptive RF module according to claim 1, wherein the switching circuit is configured to switch the between the first bus connector and the second bus connector according to a voltage detected at one of the bus connectors.

10. A modular RF assembly comprising:
an adaptive RF module according to claim 1; and
a housing configured to attach to a base unit or configured to be separate from the base unit,
wherein the adaptive RF module is arranged within the housing and wherein at least one of the first bus connector and the second bus connector is accessible from the housing.

11. The modular RF assembly according to claim 10, wherein the housing prevents accessing the first bus connector or accessing the second bus connector.

12. An RF system comprising:
the modular RF assembly according to claim 10; and the base unit,
wherein the modular RF assembly is communicatively connected to the base unit by the first bus connector or the second bus connector.

13. The RF system according to claim 12, wherein the switching circuit switches between the first bus connector and the second bus connector to receive the first voltage or the second voltage according to a voltage detected.

14. The RF system according to claim 12, wherein the modular RF assembly is mounted to the base unit and physically coupled to the base unit by the first bus connector,
wherein the first bus connector is an internal interface, and wherein the switching circuit supplies the operational voltage to the RF unit using the first voltage from the first bus connector.

15. The RF system according to claim 12, wherein the first voltage is substantially an operational voltage of the RF unit.

16. The RF system according to claim 12, wherein the modular RF assembly is physically separated from the base unit and coupled to the base unit over a wire by the second bus connector, where the wire is arranged exterior to the housing and to a casing,
wherein the first bus connector is an internal interface, and wherein the switching circuit supplies the second voltage to the adaptive RF module.

17. The RF system according to claim 16, wherein the adaptive RF module is communicatively coupled to the base unit by the second bus connector, and
wherein the second bus connector is Ethernet.

18. The RF system according to claim 16, wherein a voltage controller reduces the second voltage to an operational voltage of the RF unit.

19. An internal modular RF assembly comprising:
an RF module according to claim 1; and
a housing configured to attach to a base unit,
wherein the adaptive RF module is arranged within the housing,
wherein the first bus connector is an internal interface, and
wherein the housing is configured so the first bus connector is assessable and the second bus connector inaccessible.

20. An external modular RF assembly according, comprising:
an RF module according to claim 1; and
a housing configured to attach to a base unit; and
wherein the adaptive RF module is arranged within the housing,
wherein the first bus connector is an internal interface,
wherein the second bus connector is configured to connect over a wire to the housing to the base unit arrange remotely from the external modular RF assembly, and
wherein the second bus connector is assessable from the housing and the first bus connector is inaccessible.

* * * * *